June 29, 1948.  L. H. VAUTRAIN  2,444,316
METHOD OF RECOVERING HYDROGEN FLUORIDE
FROM HYDROCARBON MIXTURES
Filed Jan. 1, 1944
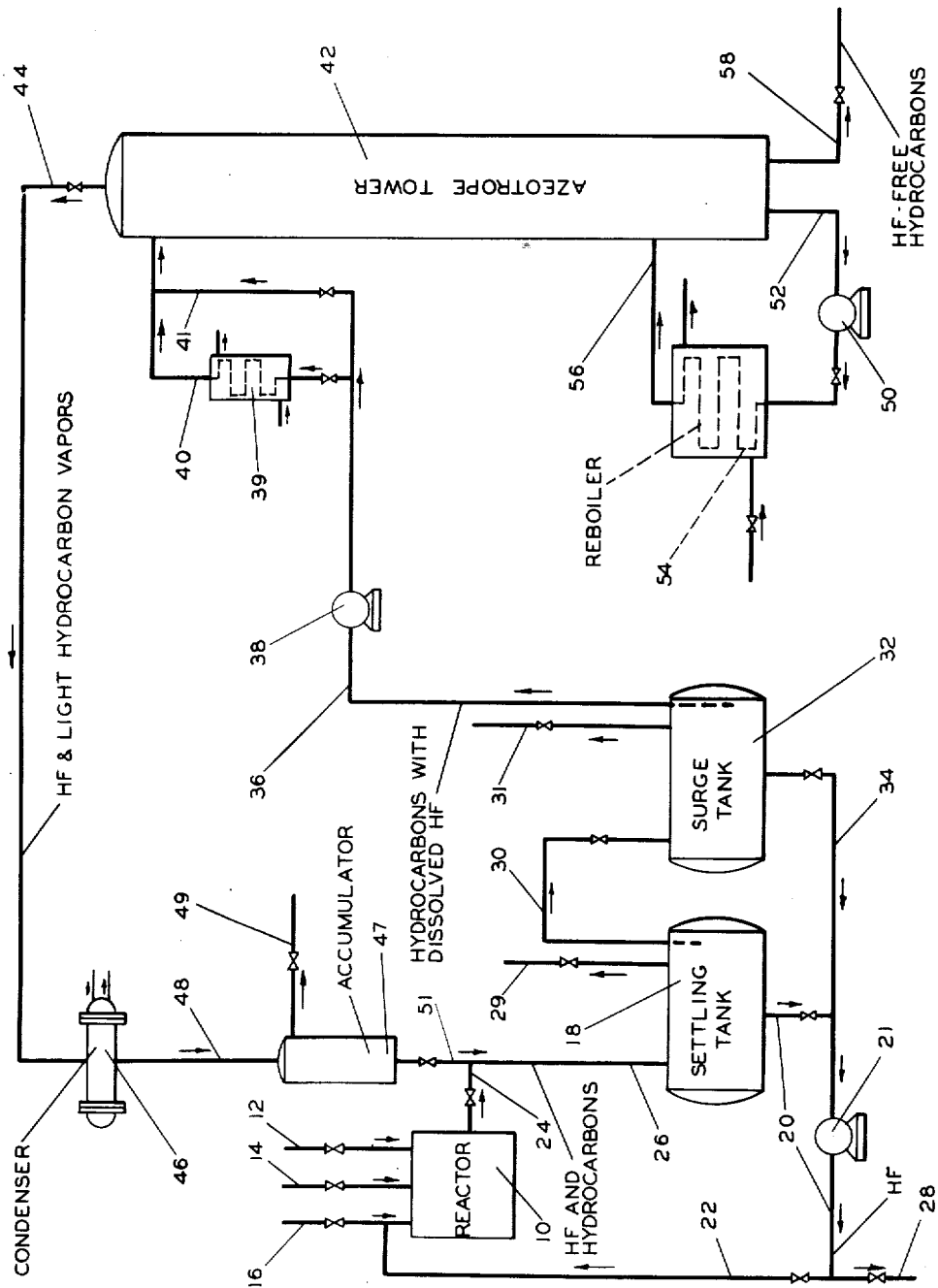
INVENTOR
L.H. VAUTRAIN
BY
ATTORNEYS Patented June 29, 1948

2,444,316

UNITED STATES PATENT OFFICE 2,444,316

METHOD OF RECOVERING HYDROGEN FLUORIDE FROM HYDROCARBON MIXTURES

Lucien H. Vautrain, Borger, Tex., assignor to Phillips Petroleum Company, a corporation of Delaware Application January 1, 1944, Serial No. 516,672

6 Claims. (Cl. 260—683.4)

This invention relates to the distillation of mixtures of hydrogen fluoride and hydrocarbons. In a specific embodiment the invention relates to the recovery of hydrogen fluoride from admixture with hydrocarbon material containing low-boiling paraffin hydrocarbons. The invention in a specific modification relates to the operation of an azeotropic fractionation wherein a low-boiling paraffin-hydrogen fluoride azeotrope is recovered overhead with the production of a hydrogen fluoride-free bottom product.

Hydrogen fluoride has recently come into prominence as a very important catalyst for numerous organic reactions. For example, it is used as a catalyst in the conversion of hydrocarbons by alkylation, isomerization, reconstruction, cracking, cyclization and/or aromatization. It is also used as a reactant in the production of alkyl fluorides. Liquid hydrogen fluoride has also been found useful as a refining agent or selective solvent in the removal of certain impurities from saturated hydrocarbons.

Perhaps the most important industrial process at the present time involving the use of hydrogen fluoride is the alkylation of low-boiling paraffinic hydrocarbons, particularly isobutane, with alkylating agents, particularly olefins such as propylene and butylenes, to form normally liquid high octane number paraffins suitable for use in aviation fuels. In such alkylation processes the reactants are intimately contacted in liquid phase with liquid concentrated hydrofluoric acid, and reaction effluents are passed to a settling zone wherein a liquid hydrocarbon phase and a liquid acid phase are separated. The acid phase is largely recycled to the reaction and a portion thereof may be subjected to purification, as by distillation for the removal of water and acid-soluble oils, before being re-introduced as a catalyst into the process. The hydrocarbon phase is ordinarily introduced at an intermediate point into a fractionating tower provided with kettle heating and reflux cooling, from which tower an overhead fraction is recovered comprising all the hydrogen fluoride together with at least sufficient light hydrocarbons to form azeotropes therewith. Inasmuch as a large excess of the low-boiling paraffin reactant, such as isobutane, is maintained in the alkylation reaction mixture, and some propane is usually also present, there is adequate light hydrocarbon in the feed to the azeotrope tower to allow complete separation of hydrogen fluoride overhead. The overhead product may be subjected to separate cooling and condensation and passed to a separate settling zone for separation of acid phase and hydrocarbon phase. The acid phase is returned to the reaction, while the hydrocarbon phase is pumped to the top of the azeotrope tower to provide reflux. A large volume of light hydrocarbons must thus be continually condensed and revaporized to provide sufficient cooling. The reflux accumulator and pump required for this operation are of course subject to corrosion by the acid.

In the operations just described it is necessary to provide a substantial amount of cooling in the top of the fractionator for the production of reflux. This is done either by internal cooling coils within the fractionator, which are subject to well-known limitations and objections, or by external condensation of a portion of the overhead product and pumping resulting condensate to the top of the fractionator as in the method described, which is ordinarily preferred. Sufficient cooling must be provided to remove a substantial portion of the heat imparted to the system by the reboiler at the bottom of the column. Such reboiling and refluxing operations are now well known to the art. Furthermore, the fractionator is operated at a relatively high pressure due to the low-boiling nature of the overhead product.

It is an object of this invention to provide an improved process for the distillation of hydrogen fluoride-containing mixtures.

Another object is to recover hydrogen fluoride from admixture with hydrocarbons.

A further object is to improve the operation of a fractionation system in which a minimum-boiling azeotropic mixture of hydrogen fluoride with low-boiling paraffinic hydrocarbon material is produced in an overhead product.

Yet another object is to provide reflux for such a system in a novel and advantageous manner.

Another object is to reduce the amount of cooling required in such a system.

Another object is to reduce the pressure in such a system.

A further object is to reduce the equipment needed for such a system.

A yet further object is to provide such a system in which the amount of equipment in contact with acid is reduced.

Another object is to increase the capacity of a fractionator.

Still another object is to recover a hydrocarbon fraction substantially free of hydrogen fluoride from a mixture containing low-boiling hydrocarbons and hydrogen fluoride.

A further object is to provide an improved method for recovering hydrogen fluoride catalyst for re-use in a reaction zone, and to recover hydrocarbon material free from hydrogen fluoride, in a process for the conversion of hydrocarbons, particularly in an alkylation process.

Other objects and advantages of the invention will be apparent, to one skilled in the art, from the accompanying disclosure and description.

I have now discovered an improved manner of carrying out fractionations of the nature described. By employing the principles of my invention the complete recovery of hydrogen fluoride overhead is possible without the necessity of providing the conventional reflux, while still producing the desired HF-free bottom product. In this improved manner of operating the azeotropic distillation, the cooling ordinarily provided in the top of the azeotrope tower may be entirely dispensed with. Nor is it necessary to provide an arrangement for separate condensation and recovery of overhead product for re-use as refluxing medium. In addition to the savings in equipment, which is an important item at the present time, the amount of equipment in contact with acid, and hence subject to corrosion, is reduced. A given fractionator is also enabled to handle a larger load, that is produce more bottom product of a given purity.

The improved operation is obtained in a very simple manner by introducing the liquid hydrocarbons phase, from which acid has been settled but which still contains dissolved acid, as feed to the fractionator at the top of the fractionator rather than at an intermediate point as is conventional, coupled with removing overhead vapors and returning the same to a point in the system ahead of the fractionator, preferably to the acid settler. This liquid feed is normally obtainable at substantially atmospheric temperatures, and since the fractionator is readily and usually operated at elevated temperatures, the feed itself provides all the cooling that is necessary within the fractionator. Even when the feed is at somewhat elevated temperatures, the fractionator is easily operated at sufficiently higher temperature that the feed acts as reflux. In some cases in fact, the feed is heated somewhat before introduction into the fractionator. It will accordingly be seen that the liquid feed containing dissolved hydrogen fluoride as well as low-boiling unreacted hydrocarbons and higher-boiling alkylate acts as refluxing medium for the azeotrope tower. The overhead vapors carrying the hydrogen fluoride are condensed and returned to the acid settler together with the reactor effluents, rather than to a separate settler as heretofore, so that carrying over of heavier hydrocarbons, which occurs to a limited extent in this method of operation, introduces no problems, for these heavier hydrocarbons are merely returned again to the fractionator. Such an operation as this is impossible in ordinary fractional distillations because of contamination of overhead product with part of the material normally removed as bottom product. The previous methods of carrying out this azeotropic distillation avoided such carryover, but such a pure product is not required when passing same to the primary settler and hence represents a needless burdening of the fractionation system. In effect the present invention establishes an internal circuit through which a certain amount of light hydrocarbons and smaller amounts of heavier hydrocarbons continuously circulate, this circuit comprising the settler, top of the "azeo" tower, condenser, and back to the settler. Acid dissolved in the hydrocarbon phase passes once through this circuit and upon returning to the settler in the overhead condensate does not redissolve in the hydrocarbon phase, which is already saturated with HF, but settles out and is recovered with the acid phase. The total hydrocarbon portion of the reactor effluent, except that small part which is dissolved in the acid phase, passes into the fractionator and out as kettle product. The net effect is that the hydrocarbon phase from the acid settler is stripped only of dissolved HF. By the practice of my invention not only are considerable equipment and cooling costs avoided but an extremely smooth operation of the fractionator is obtained. This is due in part to the fact that only one stream need be controlled as it enters the fractionator. By operating the fractionator as a stripper in accordance with the invention, the capacity of the fractionator is increased, and it may be operated at a lower pressure, or at higher temperatures, which in any case allows greater throughput.

The invention may perhaps be more adequately understood by reference to the accompanying drawing and description thereof. The drawing represents somewhat diagrammatically one preferred arrangement of apparatus elements, and flow of materials therethrough, in which the process of the invention may be practiced. While the elements essential to an understanding of the invention are shown in the drawing, it will be appreciated that various auxiliary pieces of equipment may be provided by one skilled in the art. It will also be appreciated that various modifications may be made without departing from the spirit and scope of the invention.

In the drawing a reaction zone is represented diagrammatically by the rectangle 10. In a preferred operation this reactor is used in carrying out the alkylation of a low-boiling paraffin, preferably isobutane, with one or more low-boiling olefins, such as a mixture of butenes. The isoparaffin may be introduced by line 12 while the olefin is introduced by line 14. Make-up liquid hydrogen fluoride catalyst is introduced through line 16. The bulk of the catalyst is recycled to the reactor from the bottom of settling tank 18 via lines 20 and 22. In some cases it is desirable to incorporate a minor amount of boron fluoride with the liquid hydrogen fluoride as disclosed in the copending application of Frey, Serial No. 467,954.

Methods of effecting the desired alkylation reaction will not be described here in detail inasmuch as they form no part of the present invention and are known to the art. Such methods are disclosed, for example, in U. S. Patent 2,322,800 of Frederick E. Frey, Frey's application Serial No. 424,204 and the aforesaid application of Frey, Serial No. 467,954. While an alkylation reaction is disclosed specifically in describing the invention, it is to be understood that reactions other than alkylation may be carried out in reactor 10. For example, the isomerization of saturated hydrocarbons in the presence of hydrogen fluoride as a catalyst may be carried out in reactor 10. Furthermore, a combination of HF-catalyzed alkylation and isomerization reactions may be effected in reactor 10 in one or more stages. It will be appreciated that my invention may be applied to effluents from any of such processes or others known to the art involving the conversion or treatment of hydrocarbon materials in which an effluent stream containing hydrogen fluoride and low-boiling hydrocarbons is obtained. The apparatus comprising reactor 10 may accordingly be varied to suit the particular process and will comprise one or more reaction zones and may in addition comprise much auxiliary apparatus which need not be shown or discussed here in detail.

Considering the case in which isobutane is alkylated with butylenes in reactor 10, liquid concentrated hydrofluoric acid and liquid hydrocarbon reactants under pressure, are agitated together to produce a temporary emulsion of hydrocarbon and acid phases and give ready access of isobutane to the acid phase wherein most of the reaction takes place. The emulsion is vigorously circulated to distribute the olefin reactant in low concentration and thus discourage polymerization and permit a maximum of alkylation. A severalfold molar excess at least of isobutane over olefin is maintained to minimize realkylation of primary alkylate. Normal paraffins act as diluents and impede access of isobutane to the catalyst and are preferably kept at low concentration. Actually, due to the impracticability of preparing absolutely pure feed stocks and possibly due also to side reactions, some normal butane and some propane are ordinarily present, along with traces of lighter gases. A reaction temperature of 75 to 115° F. gives good results and can be maintained by water cooling to take up exothermic heat of reaction; refrigeration is not necessary. Reaction time is less than one hour, and ordinarily 10 to 15 minutes is adequate. With continued use the acid acquires acid-soluble organic contaminants which are removed by distillation; the titratable acidity of the catalyst phase is usually maintained at 85 to 90 per cent.

Effluents from the reactor zone 10 contain unconverted low-boiling hydrocarbons including propane and a large excess of isobutane, together with higher-boiling paraffinic hydrocarbons produced by alkylation reaction and hydrogen fluoride catalyst. Such effluents are continuously withdrawn via lines 24 and 26 and passed to settling tank 18 wherein a phase separation is readily obtained. In case the conversion carried out in reactor 10 is at a temperature above that allowing separation of the effluents into the liquid phases, suitable cooling means (not shown) may be provided in line 24 or line 26 to effect the desired phase separation and bring the mixture to the preferred temperature range. The acid phase is withdrawn from settler 18 via line 20 as heretofore mentioned and returned by pump 21 to the reactor. A portion of this acid is usually withdrawn via line 28 and passed to purification means not shown, after which it is reintroduced along with make-up acid through line 16. From settling tank 18 the upper (hydrocarbon) phase, which contains small amounts of hydrogen fluoride dissolved therein, is passed via line 30 into surge tank 32. Small amounts of undissolved acid may drop out in tank 32 and be recovered through line 34. Pop-off lines 29 and 31 are provided at the tops of tanks 18 and 32, respectively, for release of small amounts of light gases which may accumulate therein. In a typical operation the tanks are held under 100 and 60 pounds gage pressure, respectively. The liquid hydrocarbon phase containing dissolved HF is withdrawn through line 36 by means of pump 38 and passed via line 40 and/or line 41 into a high point of fractionator 42, preferably being introduced upon the top tray of the fractionator. This liquid feed is ordinarily obtained from surge tank 32 at substantially atmospheric temperature or only slightly above and need not be further cooled before being introduced into tower 42. In fact, in order to increase the capacity of the fractionator, the feed stream may be heated somewhat by heater 39.

In azeotrope tower 42 a continuous fractionation is carried out whereby all of the dissolved hydrogen fluoride is stripped from the feed and withdrawn in the overhead product via line 44 along with at least sufficient propane, isobutane, and/or other light hydrocarbons to form an azeotropic mixture therewith. Propane and lighter gases may comprise a substantial proportion of the light hydrocarbon material taken off in line 44, the remainder being isobutane and heavier, including some vaporized alkylate. The low-boiling fraction in line 44 is passed to condenser 46 and the condensate passed therefrom via line 48 to accumulator 47. Uncondensed gases may be periodically or continuously withdrawn through line 49. Pressure in accumulator 47 is normally held at about 120-160 pounds, or a little lower than the fractionator presusre. Liquid passes via line 51 to settling tank 18 in admixture with the reactor effluents, or may be passed to tank 32 if desired.

From the bottom of fractionator 42 a liquid stream is passed by means of pump 50 through line 52 into reboiler means 54 wherein sufficient heat is imparted by a heat source such as fire or steam to carry out the fractionation in tower 42. This reboiler is preferably an externally heated unit as shown, but may comprise heating coils placed within the bottom of tower 42 in known manner. In the arrangement shown heated liquid is returned to the lower portion of the fractionator through the line 56. A kettle product essentially free from hydrogen fluoride is withdrawn through line 58. This product comprises the normally liquid alkylate as well as inert hydrocarbons and excess isobutane, and corresponds essentially to the hydrocarbon content of the reactor effluents except for that dissolved in the acid phase in settler 18. The HF-free kettle product is passed to further fractionation means (not shown) for the recovery and recycle of isobutane through line 12, and recovery of the desired alkylate. Ordinarily this kettle product is subjected to a defluorination treatment prior to such fractionation.

As an example of the actual operation of an alkylation plant in accordance with my invention, the following data are presented. It will be appreciated that these data are merely illustrative and are not to be construed as being unduly limiting the invention. A combined hydrocarbon feed including fresh reactants plus recycled isobutane is passed into the reactors at 75° F. at a rate of 732 barrels per hour. The perature of this feed may upon occasion vary from about 75 to about 100° F., and the quantity may range from 600 to 900 barrels per hour, depending upon availability of feed stocks. Recycle, regenerated, and makeup acid enters at similar temperatures (80° F. in this instance) and similar rates (732 barrels per hour), so that a 1:1 volume ratio of hydrocarbon to acid is used. Total effluents from the reactors is passed to settler 18 at a temperature of 80° F. Hydrocarbon liquid in the quantity of 820 barrels per hour is pumped from the settlers through line 36 and heater 39, wherein it is raised to 100-130° F., in this case 120° F., at which temperature it enters the top of the azeotrope column 42. This stream may vary from 650 to 1000 barrels per hour with the previously mentioned range of feed rates. Column 42 is a 7 foot diameter, 20 plate fractionator, and is operated with a kettle temperature of 183° F. (180-190° F. ordinary range), at 164 pounds per square inch gage pressure (ranging from 160-180 pounds), and an overhead vapor temperature of 147° F. (145-150° F. range) The overhead vapors upon condensation amount to 65 to 100 barrels per hour, of which 5 to 15 barrels per hour is HF. In the specific operation here described, 82 barrels per hour overhead is produced, of which 12 barrels is HF. The kettle product of 740 barrels per hour is free from HF.

It is interesting to note that the above operation represents an appreciable overload on the column in comparison with design and ordinarily used throughput rates. However, the practice of the present invention is an important factor in enabling the column to handle this load and still produce a hydrogen fluoride-free kettle product.

I claim:

1. In a process for the production of a normally liquid paraffinic hydrocarbon material by the alkylation of low-boiling alkylatable paraffinic hydrocarbons with an alkylating agent in the presence of a hydrogen-fluoride-containing alkylation catalyst, the improved method of recovering hydrogen fluoride for re-use in the process and also recovering said normally liquid paraffinic hydrocarbon material substantially free from hydrogen fluoride which comprises passing material effluent from said alkylation and containing a liquid hydrogen fluoride phase and a liquid hydrocarbon phase including unconverted low-boiling alkylatable paraffins to a phase separating means, passing also to said phase separating means a low-boiling fraction comprising hydrogen fluoride and low-boiling paraffins obtained as hereinafter described, recovering liquid hydrogen fluoride phase from said phase separating means and returning same to said alkylation, passing liquid hydrocarbon phase containing dissolved hydrogen fluoride from said phase separating means to the top of a fractional distillation means as feed and as substantially the sole reflux, supplying heat to the bottom of said fractional distillation means to effect fractionation therein, recovering from the top of said fractional distillation means a low-boiling fraction containing essentially all of said dissolved hydrogen fluoride together with at least sufficient low-boiling paraffins to form a minimum-boiling azeotropic mixture with said hydrogen fluoride and passing same to said phase separating means as described, and recovering from the bottom of said fractional distillation means a substantially hydrogen fluoride-free hydrocarbon material comprising said normally liquid paraffinic hydrocarbon material produced in said alkylation.

2. The process of claim 1, wherein said low-boiling alkylatable paraffins comprise isobutane.

3. The process of claim 1, wherein said low-boiling alkylatable paraffins comprise isobutane, and wherein minor amounts of propane are present in said liquid hydrocarbon phase and in said low-boiling fraction.

4. In a process for the production of a normally liquid paraffinic hydrocarbon material by the alkylation of low-boiling alkylatable paraffinic hydrocarbons with an alkylating agent in the presence of a hydrogen fluoride-containing alkylation catalyst, the improved method for recovering hydrogen fluoride for re-use in the process and also for recovering said normally liquid paraffinic hydrocarbon material substantially free from hydrogen fluoride which comprises passing a resulting effluent from said alkylation to a separating means in which a liquid hydrogen fluoride-rich phase and a liquid hydrocarbon-rich phase are formed, recycling at least a portion of said hydrogen fluoride-rich phase to said alkylation, passing said liquid hydrocarbon-rich phase containing dissolved hydrogen fluoride into a high point in a fractional distillation zone at a temperature sufficiently low that said liquid phase acts as reflux in said zone, said liquid hydrocarbon-rich phase being the sole reflux provided to said zone, separating from said fractional distillation a low-boiling vaporous fraction containing a low-boiling paraffin hydrocarbon and hydrogen fluoride, cooling and condensing said low-boiling fraction without further fractionation, circulating the resulting condensate from the aforesaid condensation to said separation means whereby the hydrogen fluoride in said low-boiling fraction is returned to said alkylation and separating also from said fractional distillation a higher-boiling hydrocarbon fraction substantially free from hydrogen fluoride and containing normally liquid paraffinic hydrocarbon material produced in said alkylation.

5. In a process for reacting paraffin hydrocarbons in the presence of hydrogen fluoride, the improvement which comprises passing effluents directly from a reaction zone, in which a low-boiling paraffin is reacted in the presence of a catalyst comprising hydrogen fluoride, to separating means under conditions such that liquid hydrogen fluoride separates as a separate phase from a liquid hydrocarbon phase, returning at least a portion of said liquid hydrogen fluoride phase back to said reaction zone, passing said liquid hydrocarbon phase containing dissolved hydrogen fluoride to a high point in a fractional distillation zone as feed and as substantially the sole reflux for said zone, stripping from said feed in said fractional distillation zone a low-boiling fraction containing hydrogen fluoride and a low-boiling paraffin, and returning said low-boiling fraction to said separating means whereby the hydrogen fluoride in said low-boiling fraction is returned to said reaction zone.

6. In a process for the production of a normally liquid paraffinic hydrocarbon material by the alkylation of isobutane with an alkylating agent in the presence of a hydrogen fluoride-containing alkylation catalyst, the improved method for recovering hydrogen fluoride for re-use in the process and also for recovering said normally liquid paraffinic hydrocarbon material substantially free from hydrogen fluoride which comprises passing a resulting effluent from said alkylation in the liquid phase to a separation zone wherein a liquid hydrocarbon-rich phase and a liquid hydrogen fluoride-rich phase are formed, passing said hydrocarbon-rich phase containing dissolved hydrogen fluoride at a temperature between about 100 and about 130° F. as substantially the sole feed into a high point in a fractional distillation zone, said mixture being the sole reflux provided to said zone, maintaining a kettle temperature between about 180 and about 190° F. and an overload vapor temperature between about 145 and about 150° F., maintaining a pressure within said distillation zone between about 160 and about 180 pounds per square inch gage, separating from said fractional distillation a low-boiling vaporous overhead fraction comprising essentially all of the hydrogen fluoride in said mixture entering said fractional distillation zone together with isobutane, separating also from said fractional distillation a liquid hydrocarbon fraction essentially free from hydrogen fluoride containing normally liquid paraffinic hydrocarbon material as a product of the process, condensing said low-boiling overhead fraction without further fractionation to form a liquid hydrogen fluoride-rich phase and a liquid hydrocarbon-rich phase, passing substantially all of the resulting condensate of the aforesaid condensation to said separation zone and recycling said hydrogen fluoride-rich phase to said alkylation.

LUCIEN H. VAUTRAIN.

REFERENCES CITED

The following references are of record in the file of this patent:

UNITED STATES PATENTS

| Number | Name | Date |
|---|---|---|
| 2,222,645 | Aldinger | Nov. 26, 1940 |
| 2,259,951 | Eversole | Oct. 21, 1941 |
| 2,290,654 | Sutherland | July 21, 1942 |
| 2,301,304 | Maxwell | Nov. 10, 1942 |
| 2,320,629 | Matuszak | June 1, 1943 |
| 2,322,800 | Frey | June 29, 1943 |
| 2,342,166 | Plummer | Feb. 22, 1944 |
| 2,347,317 | Gibson | Apr. 25, 1944 |
| 2,372,338 | Penisten | Mar. 27, 1945 |

OTHER REFERENCES

Robinson: "Elements of Fractional Distillation," second edition (1930), pages 161 and 162.

Continental Plant: "The Refiner"; volume 21, January 1942; pages 51–56 and 58.

Robinson: "Elements of Fractional Distillation," second edition, published 1930 by McGraw-Hill Book Co., 370 Seventh Ave., New York, N. Y. Copy in Div. 25, pages 170 and 171.

Certificate of Correction

Patent No. 2,444,316.   June 29, 1948.

LUCIEN H. VAUTRAIN

It is hereby certified that errors appear in the printed specification of the above numbered patent requiring correction as follows: Column 6, line 24, for "presusre" read *pressure*; line 61 for "perature" read *temperature*; column 8, line 71, claim 6, for the word "overload" read *overhead*; and that the said Letters Patent should be read with these corrections therein that the same may conform to the record of the case in the Patent Office.

Signed and sealed this 14th day of September, A. D. 1948.

[SEAL]

THOMAS F. MURPHY,
*Assistant Commissioner of Patents.* boiling vaporous overhead fraction comprising essentially all of the hydrogen fluoride in said mixture entering said fractional distillation zone together with isobutane, separating also from said fractional distillation a liquid hydrocarbon fraction essentially free from hydrogen fluoride containing normally liquid paraffinic hydrocarbon material as a product of the process, condensing said low-boiling overhead fraction without further fractionation to form a liquid hydrogen fluoride-rich phase and a liquid hydrocarbon-rich phase, passing substantially all of the resulting condensate of the aforesaid condensation to said separation zone and recycling said hydrogen fluoride-rich phase to said alkylation.

LUCIEN H. VAUTRAIN.

REFERENCES CITED

The following references are of record in the file of this patent:

UNITED STATES PATENTS

| Number | Name | Date |
|---|---|---|
| 2,222,645 | Aldinger | Nov. 26, 1940 |
| 2,259,951 | Eversole | Oct. 21, 1941 |
| 2,290,654 | Sutherland | July 21, 1942 |
| 2,301,304 | Maxwell | Nov. 10, 1942 |
| 2,320,629 | Matuszak | June 1, 1943 |
| 2,322,800 | Frey | June 29, 1943 |
| 2,342,166 | Plummer | Feb. 22, 1944 |
| 2,347,317 | Gibson | Apr. 25, 1944 |
| 2,372,338 | Penisten | Mar. 27, 1945 |

OTHER REFERENCES

Robinson: "Elements of Fractional Distillation," second edition (1930), pages 161 and 162.

Continental Plant: "The Refiner"; volume 21, January 1942; pages 51–56 and 58.

Robinson: "Elements of Fractional Distillation," second edition, published 1930 by McGraw-Hill Book Co., 370 Seventh Ave., New York, N. Y. Copy in Div. 25, pages 170 and 171.

Certificate of Correction

Patent No. 2,444,316.

June 29, 1948.

LUCIEN H. VAUTRAIN

It is hereby certified that errors appear in the printed specification of the above numbered patent requiring correction as follows: Column 6, line 24, for "presusre" read *pressure*; line 61 for "perature" read *temperature*; column 8, line 71, claim 6, for the word "overload" read *overhead*; and that the said Letters Patent should be read with these corrections therein that the same may conform to the record of the case in the Patent Office.

Signed and sealed this 14th day of September, A. D. 1948.

[SEAL]

THOMAS F. MURPHY,
*Assistant Commissioner of Patents.*